(12) United States Patent
Veettil et al.

(10) Patent No.: US 8,424,776 B2
(45) Date of Patent: Apr. 23, 2013

(54) INTEGRATED VEHICLE HVAC SYSTEM

(75) Inventors: Rajesh Veettil, Troy, MI (US); Tarun Malik, New Delhi (IN); Derek F. Klima, Clarkston, MI (US); Fernando de Campos, Troy, MI (US)

(73) Assignee: Behr America, Inc., Troy, MI (US)

( * ) Notice: Subject to any disclaimer, the term of this patent is extended or adjusted under 35 U.S.C. 154(b) by 383 days.

(21) Appl. No.: 11/905,499

(22) Filed: Oct. 1, 2007

(65) Prior Publication Data

US 2008/0105756 A1 May 8, 2008

Related U.S. Application Data

(60) Provisional application No. 60/827,639, filed on Sep. 29, 2006.

(51) Int. Cl.
*B60H 1/06* (2006.01)

(52) U.S. Cl.
USPC ............... 237/12.3 A; 237/12.3 R; 237/12.7; 237/28; 237/2 B; 454/82; 454/85; 454/146; 454/148; 454/69

(58) Field of Classification Search ............ 237/12.3 R, 237/12.3 A, 12.7, 28, 30, 2 B; 454/69, 121, 454/142, 143, 82, 85, 148, 146
See application file for complete search history.

(56) References Cited

U.S. PATENT DOCUMENTS

| | | | | |
|---|---|---|---|---|
| 2,180,760 A * | 11/1939 | Mayo | ............... | 62/243 |
| 3,181,308 A * | 5/1965 | Vander Hagen | ............. | 62/238.4 |
| 4,300,720 A * | 11/1981 | Baier et al. | ............... | 237/12.3 A |
| 4,860,951 A * | 8/1989 | Waas | ............. | 237/2 A |
| 4,976,463 A * | 12/1990 | Soo | ............... | 237/8 C |
| 5,305,823 A * | 4/1994 | Elliot | ............... | 165/41 |
| 5,307,645 A * | 5/1994 | Pannell | ............. | 62/244 |
| 5,333,678 A * | 8/1994 | Mellum et al. | ............... | 165/42 |
| 6,278,083 B1* | 8/2001 | Schwarz | ............... | 219/202 |
| 6,932,148 B1* | 8/2005 | Brummett et al. | ............. | 165/43 |
| 2003/0070849 A1* | 4/2003 | Whittaker | ............... | 180/68.2 |
| 2005/0016723 A1* | 1/2005 | Araki | ............. | 165/202 |
| 2005/0198986 A1* | 9/2005 | Allen | ............. | 62/244 |
| 2006/0000594 A1* | 1/2006 | Kang et al. | ............. | 165/203 |
| 2006/0075766 A1* | 4/2006 | Ziehr et al. | ............. | 62/186 |
| 2006/0196205 A1* | 9/2006 | Richter et al. | ............. | 62/239 |

FOREIGN PATENT DOCUMENTS

DE 19807002 A1 * 10/1998

* cited by examiner

*Primary Examiner* — Avinash Savani
(74) *Attorney, Agent, or Firm* — Foley & Lardner LLP

(57) ABSTRACT

The present application relates to auxiliary HVAC systems for vehicles. In some embodiments, an auxiliary climate control system for a vehicle comprises a blower and heat exchanger assembly including a blower, an evaporator, an air flow actuator, and a heater core. The blower and heat exchanger assembly has a generally 'Z' shaped configuration.

17 Claims, 8 Drawing Sheets

INTEGRATED VEHICLE HVAC SYSTEM

The present application claims benefit of priority to U.S. Provisional Application Ser. No. 60/827,639, filed Sep. 29, 2006, the entire contents of which is incorporated herein by reference.

BACKGROUND

This application relates generally to climate control (heating, ventilating and air-conditioning, or HVAC) systems. More particularly, this application relates to HVAC systems used for motor vehicles.

Primary HVAC systems are often included for climate control of motor vehicles. These systems heat and/or cool air circulated in the occupant cabin of the vehicle. Some of these systems require energy from the vehicle engine such that the vehicle engine must be running (i.e. idling) for the HVAC system to be fully functional when the vehicle is parked. This is particularly an issue with vehicles that are commonly occupied while parked, such as recreational vehicles (RVs), busses, commercial trucks with sleeper cabs, and other such vehicles. However, idling a vehicle engine for a period of time to operate the HVAC system consumes relatively large quantities of fuel and generates exhaust.

The need for climate control in a vehicle when the engine is off is particularly needed in over the road commercial trucks. Drivers of these vehicles often take breaks in their vehicles and, when equipped with a sleeping cabin, may occupy the vehicle over night. Maintaining a comfortable temperature in the cabin at these times when the engine is turned off may require an auxiliary HVAC system.

To avoid unnecessary fuel consumption and limit the generation of exhaust while still providing a comfortable cabin temperature, auxiliary HVAC units that are independent of the vehicle engine have been used. These systems may include multiple subassemblies requiring complex installation. Also, many such systems include only a portion of a refrigerant loop. Such systems must be connected to the vehicle's primary refrigerant loop when installed. This then requires charging the system with refrigerant when installed in the vehicle. This complicates aftermarket installation of the systems.

Accordingly, there is a need for an integrated auxiliary HVAC system that does not require connection to the vehicle's primary refrigerant loop. There is also a need for a compact auxiliary HVAC system that can be easily installed into a vehicle as a single unit.

SUMMARY

The present application relates to auxiliary HVAC systems for vehicles. In some embodiments, an auxiliary climate control system for a vehicle comprises a blower and heat exchanger assembly including a blower, an evaporator, an air flow actuator, and a heater core. The blower and heat exchanger assembly has a generally 'Z' shaped configuration.

In other embodiments, an auxiliary climate control system for a vehicle comprises a blower and heat exchanger assembly including a blower, an evaporator, an air flow actuator, and a heater core. The auxiliary climate control system may further comprise a compressor in fluid communication with the evaporator and a condenser in fluid communication with both the evaporator and the compressor. The evaporator, compressor, and condenser may comprise a closed refrigeration loop.

In yet other embodiments, an auxiliary climate control system for a vehicle may comprise a blower and heat exchanger assembly including a blower, an evaporator, an air flow actuator, and a heater core. The system may also comprise a compressor in fluid communication with the evaporator, a condenser in fluid communication with both the evaporator and the compressor, and a barrier separating the condenser from the evaporator. In some of these embodiments, the barrier is coupled to a floor of a vehicle cab.

Other embodiments relate to a method for controlling the temperature of a vehicle cabin which may comprise passing inlet air through a blower and heat exchanger unit comprising a blower, an evaporator, an air flow actuator, and a heater core. The blower and heat exchanger assembly may have a generally 'Z' shaped configuration.

In still other embodiments, a method for controlling the temperature of a vehicle cabin may comprise passing air through an HVAC unit comprising a blower and heat exchanger assembly, a compressor in fluid communication with the evaporator, and a condenser in fluid communication with both the evaporator and the compressor. In some of these embodiments, the blower and heat exchanger assembly comprises a blower, an evaporator, an air flow actuator, and a heater core; and the evaporator, compressor, and condenser may comprise a closed refrigeration loop.

DETAILED DESCRIPTION

Figure 1:
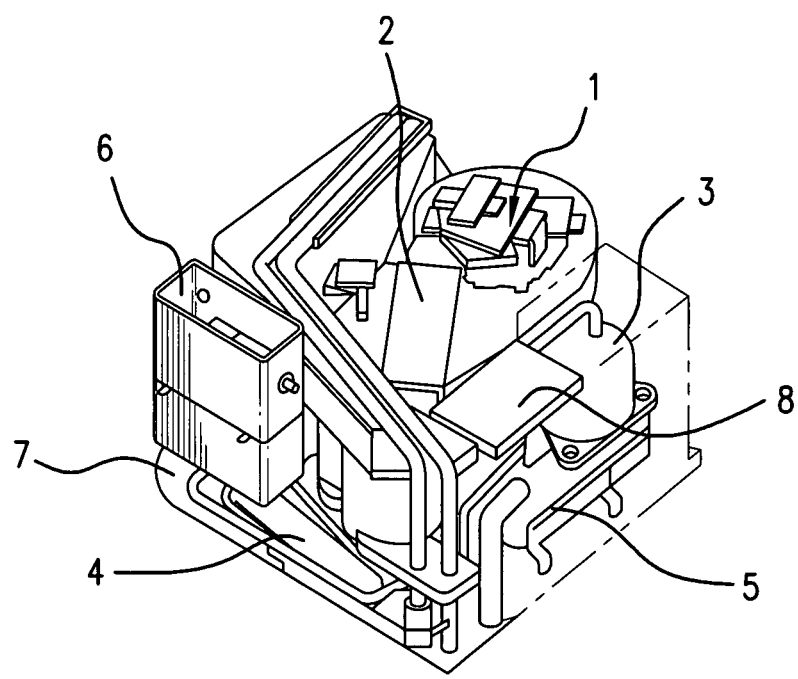
FIG. 1 is a perspective view of an integrated HVAC system.

FIG. 1 illustrates an integrated HVAC system for use in a vehicle. The system generally includes a blower motor 1, such as, for example, a brushless direct current (BLDC) blower motor, and evaporator 2 in fluid communication with a compressor 3 and a condenser 4 to form a refrigeration loop, a coolant heater 5 (shown as a fuel fired heater (FFH)), and an air outlet 6. A stamped tray 7 is provided to separate the condenser 4 and coolant heater 5 from the other components of the system.

In an exemplary embodiment, the coolant heater 5 may be a fuel fired heater (FFH) that burns fuel from the vehicle fuel supply to heat the cabin. One suitable FFH is a diesel fueled heater commercially available from ESPAR of Mississauga, Ontario. In the case of a FFH, the coolant heater may be coupled to the integrated auxiliary HVAC unit on the exterior of the vehicle, under the cab floor, to allow for safe venting of exhaust gasses.

A compressor controller 8 may be provided to regulate the compressor. This may conserve energy consumed by the compressor and regulate the temperature of the vehicle cabin. In an exemplary embodiment, the auxiliary HVAC system may be controlled by a vehicle occupant by the same control interface as the main HVAC system of the vehicle.

Figure 3:
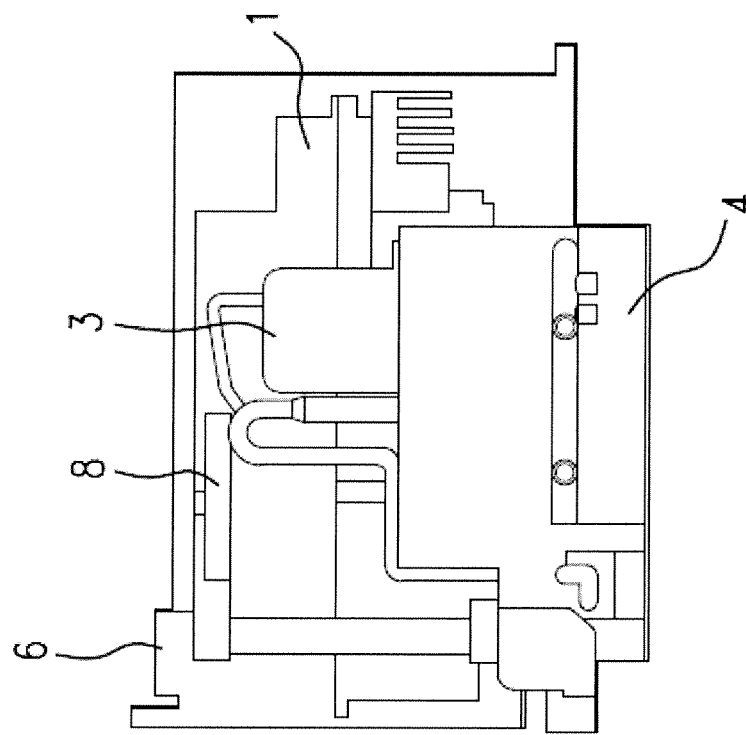
FIG. 3 is a front elevation view of the HVAC system of FIG. 1.
Figure 2:
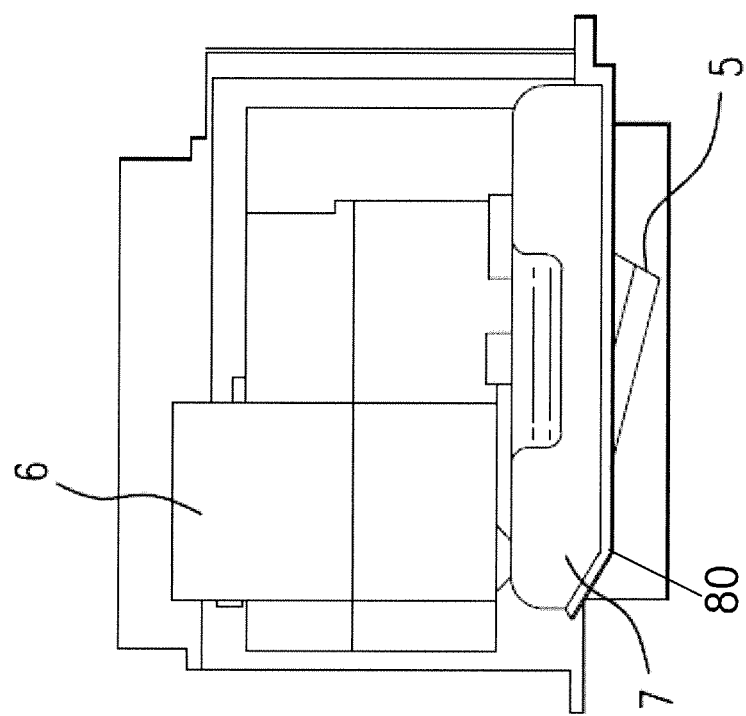
FIG. 2 is a side elevation view of the HVAC system of FIG. 1.

As shown in FIGS. 2 and 3, the system may be installed such that a lip of the stamped tray 7 is flush with the cab floor 80. This configuration places the condenser 4 and coolant heater 5 outside of the vehicle cabin allowing for heat loss from the condenser and safe exhaust venting from the coolant heater 5. Accordingly, the system may be installed in a cab floor without being plumbed with the vehicle's primary refrigeration and heating loops. In some embodiments, the system may be coupled to a floor panel of a vehicle such that an OEM can install the system simply by installing the floor panel during vehicle assembly.

Because the integrated HVAC system includes its own evaporator 2, condenser 4 and compressor 3, the system may be pre-charged with refrigerant. This simplifies installation in the vehicle by avoiding charging of the system after being connected with the vehicle's primary refrigerant loop.

Figure 4:
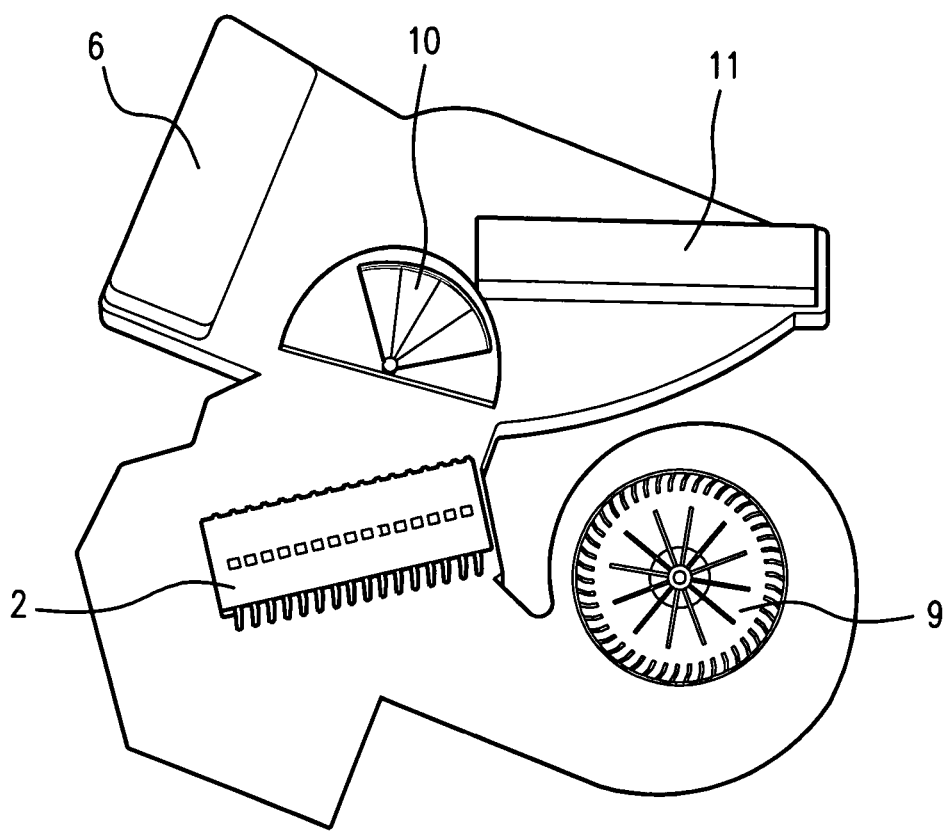
FIG. 4 is a fragmentary cross-sectional view of a portion the HVAC system of FIG. 1.

FIG. 4 shows the blower and heat exchanger assembly of the integrated HVAC unit of FIGS. 1-3. The assembly has a generally Z-shape and includes a blower 9, an evaporator 2, an air flow actuator 10 (shown as a temperature door), a heater core 11 and an air outlet 6. The temperature door is configured to pivot such that air is directed to the heater core 11, or in a way that bypasses the heater core.

Figure 5:
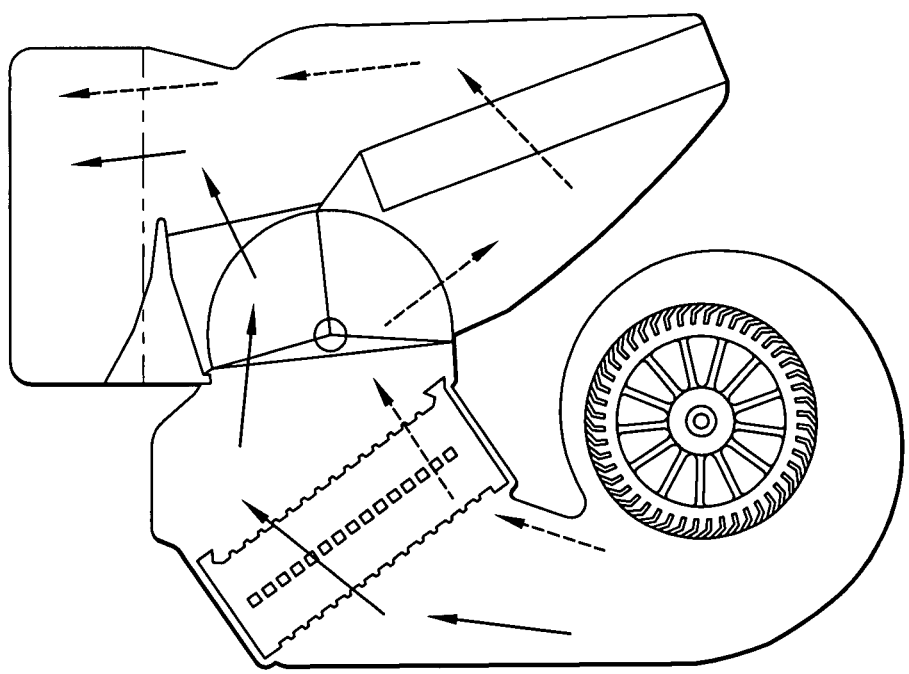
FIG. 5 is a fragmentary cross-sectional view of a portion of the HVAC system of FIG. 1.

FIG. 5 shows the general flow or air through the blower and heat exchanger assembly of FIG. 4. In FIG. 5, arrows show the general flow of air when the temperature door is in a full cold position and when the temperature door is in a full hot position.

When the temperature door is in the full cool position, air is accelerated by the blower and passes the evaporator. When the system is cooling air and the compressor (shown in FIGS. 1-3) is running, the evaporator absorbs heat from the air being moved by the blower. The cooled air is then directed away from the heater core and towards the air outlet.

When the temperature door is in the full hot position, air is accelerated by the blower and passes the evaporator. When the system is heating air, the compressor (shown in FIGS. 1-3) may be shut off to avoid absorption of heat from the air being moved by the blower and past the evaporator. The air is then directed towards the heater core. The heater core may be supplied with hot coolant from the coolant heater. As the air passes the heater core it absorbs heat and cools the coolant which is recirculated to the coolant heater. The heated air then travels to the air outlet.

The air exits the auxiliary HVAC unit at the air outlet. The air outlet may be coupled to an auxiliary duct system, or the vehicles primary air distribution system. In some embodiments, the air outlet may be provided with a sensor for detecting the temperature of the exiting air which in turn may be used by a controller logic for controlling one or more of the blower motor, compressor, and/or coolant heater.

The auxiliary HVAC unit may be positioned in a cabin zone. For example, in a commercial truck, the auxiliary unit may be placed in a sleeper cab. In such embodiments, the auxiliary HVAC system may be coupled to the vehicle's primary HVAC system to cool the sleeper cab while the vehicle is operating. If needed, the auxiliary HVAC unit may be used to provide additional cooling capacity. When the vehicle is parked and not idling (i.e. for a driver break) the integrated auxiliary HVAC system may be used to heat or cool the cab, especially the sleeper cab. The compressor is used to supply condensed refrigerant to the condenser and may be powered by an APU, vehicle batteries, batteries dedicated to the auxiliary HVAC system, and/or shore power such as a 110 volt AC power supply. In some preferred embodiments, the compressor motor is a 110 volt motor.

The heater core of the auxiliary HVAC unit receives circulated, heated coolant from the coolant heater. In some preferred embodiments the coolant heater is a FFH. The FFH may be operated using the vehicles fuel (i.e. gasoline or diesel). An exhaust port vents the FFH exhaust to the exterior of the cabin.

Figure 6:
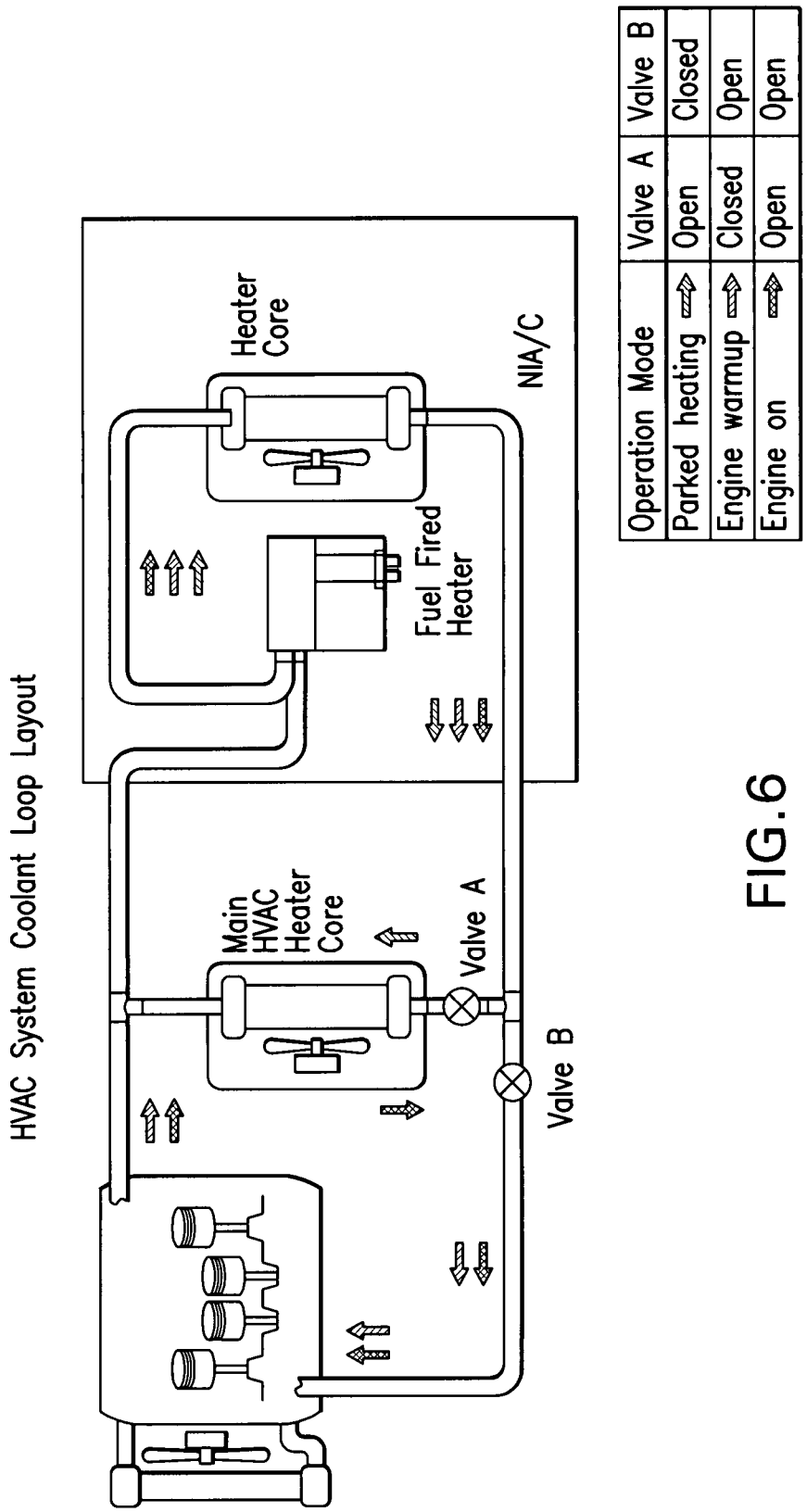
FIG. 6 is a schematic view of a coolant loop.

FIG. 6 illustrates an alternative coolant loop layout that may be employed with the auxiliary HVAC system. In some embodiments, a main HVAC heater core receives hot coolant from the vehicle engine when the vehicle is running. The engine coolant is also circulated to the coolant heater (shown as a fuel fired heater) which is in series with the heater core of the auxiliary HVAC unit. The heater core and coolant heater are in parallel with the main HVAC heater core. When the vehicle is parked and not idling, coolant may be heated in the coolant heater and circulated to the heater core to warm the air in a cabin zone (e.g., the sleeper cab). The coolant is also circulated to the main HVAC heater core such that other areas of the cabin may be heated. Valve B is closed to prevent circulation of the coolant to the engine where heat would be lost.

When the engine is running, valve B and valve A may be opened to utilize heat generated by the engine for heating the cabin. Valve A may also be closed such that hot coolant is circulated to the engine to warm the engine up prior to or just after starting.

Figure 7:
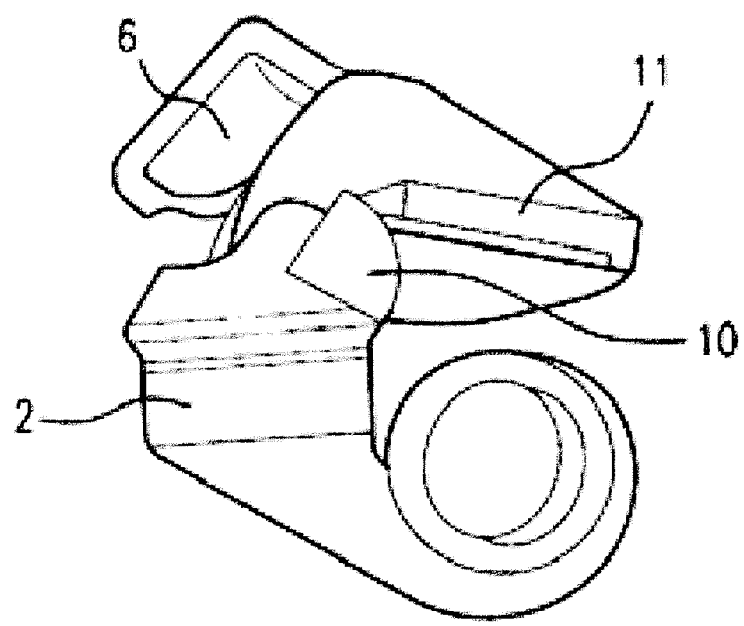
FIG. 7 is a fragmentary cross-sectional view of an alternative embodiment of an HVAC system.
Figure 8:
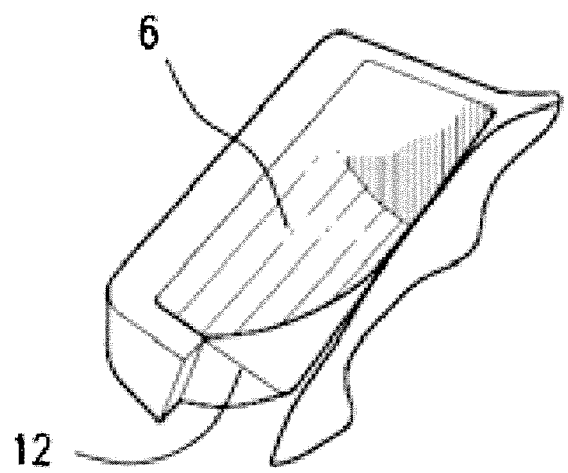
FIG. 8 is a fragmentary cross-sectional view of a portion of the HVAC system of FIG. 7.

FIGS. 7 and 8 show an alternative embodiment of a blower and heat exchanger assembly. The assembly includes an evaporator 2, a temperature door 10, a heater core 11 and an air outlet 6 similar to those shown in FIG. 4. The air outlet of the assembly includes a baffle 12 formed in a side wall of the air outlet 6. The baffle 12 increases mixing of hot and cold air as it exits the assembly to promote a more uniform temperature cross-section. The increased mixing of the air also promotes a more homogenous velocity cross-section of the air exiting the assembly.

Figure 9:
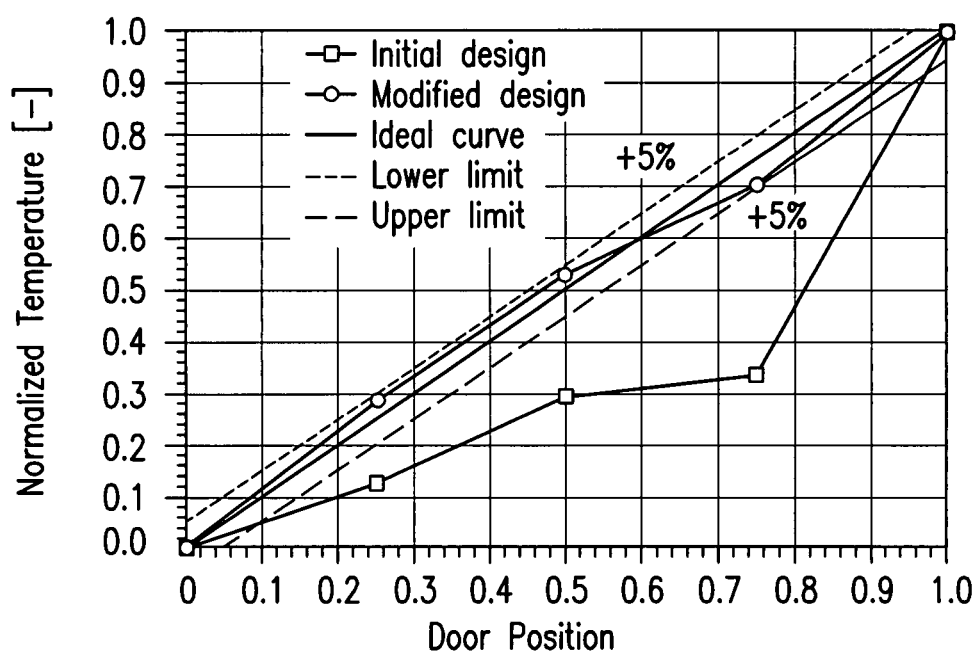
FIG. 9 is a chart showing normalized temperature for outlet air versus temperature door position for the HVAC systems of FIGS. 4 and 7.

FIG. 9 is a chart showing the normalized temperature at the air outlet as a function of temperature door position. In an ideal system the plot will be linear with a slope of 1. In FIG. 9, the "Modified design" refers to the assembly design of FIG. 7, while the "Initial design" refers to the assembly design of FIG. 4. As shown in FIG. 9, the normalized temperature curve of the assembly of FIG. 4 is made more linear with the addition of the baffle at the air outlet and deviates less than 5% from the ideal curve.

Figure 10:
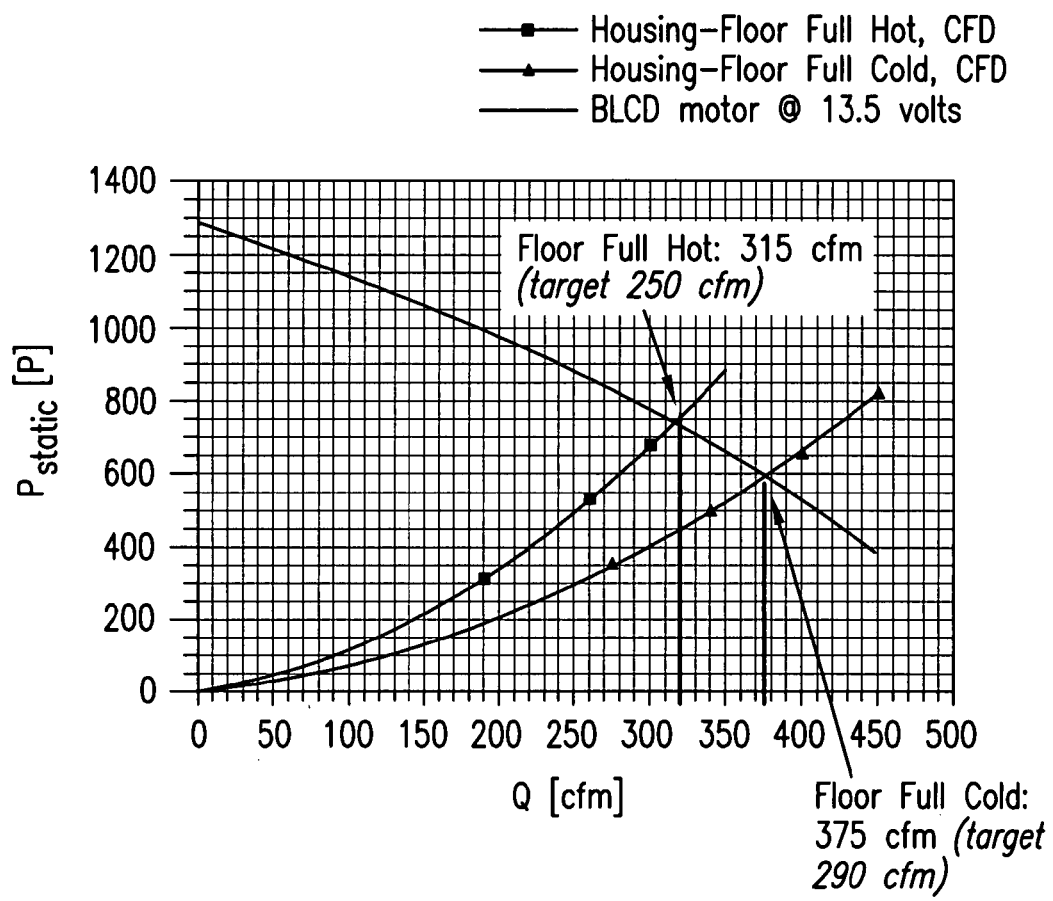
FIG. 10 is a chart of static pressure versus volumetric flow rate of air for the HVAC system of FIG. 7.

As shown in FIG. 10, the z shaped assemblies of FIG. 7 can be used to produce adequate air flow rates. The target flow rate for a vehicle HVAC system operating in the full hot mode is 250 ft$^3$/min (cfm). The assembly of FIG. 7, when operated with a BLDC motor at 13.5 volts will generate a flow rate of 315 cfm. This is in spite of the 'Z'-shaped configuration which, while saving space, would have been expected to create undesired pressure drops and thus decrease flow rates.

Also, for a vehicle HVAC system in full cold mode, the target flow rate is 290 cfm. The assembly of FIG. 7, when used with a BLDC motor operating at 13.5 volts, will generate a flow rate of 375 cfm. Accordingly, adequate flow rates, temperature cross-sections, and velocity cross-sections can be generated using the assembly of FIG. 7 while also incorporating the 'Z'-shaped configuration that allows for a compact unit.

Although the foregoing has been described with reference to example embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be as broad as possible. For example, unless specifically otherwise noted, the claims reciting a single particular element also encompass a plurality of such particular elements.

What is claimed is:

1. An auxiliary climate control system for a vehicle comprising:
   a blower and heat exchanger assembly including a blower, an evaporator, an air flow actuator, and a heater core;
   a condenser in fluid communication with the evaporator;
   a coolant heater, the condenser and the coolant heater below the blower and heat exchanger assembly; and
   a barrier separating the condenser and the coolant heater form the blower and heat exchanger assembly such that the condenser and the coolant heater are outside of a vehicle cab,
   wherein the blower and heat exchanger assembly has a generally 'Z' shaped configuration in a horizontal plane.

2. The auxiliary climate control system of claim 1, wherein the air flow actuator is a temperature door.

3. The auxiliary climate control system of claim 1, wherein the coolant heater coupled to the heater core.

4. The auxiliary climate control system of claim 3, further comprising an engine coolant system, wherein the coolant heater is coupled to the engine coolant system.

5. An auxiliary climate control system for a vehicle comprising:
   a blower and heat exchanger assembly including a blower, an evaporator, an air flow actuator, and a heater core;
   a compressor in fluid communication with the evaporator;
   a condenser in fluid communication with both the evaporator and the compressor;
   a coolant heater, the condenser and the coolant heater below the blower and heat exchanger assembly; and
   a barrier separating the condenser and the coolant heater from the blower and heat exchanger assembly such that the condenser and the coolant heater are outside of a vehicle cab,
   wherein the evaporator, compressor, and condenser comprise a closed refrigeration loop and
   wherein the blower and heat exchanger assembly has a general 'Z' shaped configuration in a horizontal plane.

6. The auxiliary climate control system of claim 5, wherein the closed refrigeration loop is configured to be separate of any other refrigeration loop in the vehicle.

7. The auxiliary climate control system of claim 6, wherein the closed refrigeration loop is charged with refrigerant prior to installation in a vehicle.

8. The auxiliary climate control system of claim 5, wherein the heater core coupled to a coolant heater.

9. The auxiliary climate control system of claim 8, further comprising an engine coolant system, wherein the coolant heater is coupled to the engine coolant system.

10. The auxiliary climate control system of claim 5, wherein the system is installed in the floor of an occupant cabin.

11. The auxiliary climate control system of claim 5, wherein the barrier is coupled to a floor of a vehicle cab.

12. A method for controlling the temperature of a vehicle cabin comprising:
    passing inlet air through a blower and heat exchanger unit comprising a blower, an evaporator, an air flow actuator, and a heater core;
    wherein a condenser is in fluid communication with the evaporator,
    wherein the condenser and a coolant heater are below the blower and heat exchanger unit,
    wherein a barrier separates the condenser and the coolant heater from the blower and heat exchanger unit such that the condenser and the coolant heater are outside of a vehicle cab, and
    wherein the blower and heat exchanger assembly has a generally 'Z' shaped configuration in a horizontal plane.

13. A method for controlling the temperature of a vehicle cabin comprising:
    passing air through an HVAC unit including a blower and heat exchanger assembly, a compressor in fluid communication with the evaporator, a condenser in fluid communication with both the evaporator and the compressor, a coolant heater wherein the condenser and the coolant heater are below the blower and heat exchanger assembly, and a barrier separating the condenser and the coolant heater from the blower and heat exchange assembly such that the condenser and the coolant heater are outside of a vehicle cab;
    wherein the blower and heat exchanger assembly includes a blower, the evaporator, an air flow actuator, and a heater core,
    wherein the evaporator, compressor, and condenser include a closed refrigeration loop, and
    wherein the blower and heat exchanger assembly has a generally 'Z' shaped configuration in a horizontal plane.

14. The auxiliary climate control system of claim 1, further comprising a baffle configured to increase mixing of air as it exits the blower and heat exchanger assembly to promote a more uniform temperature cross-section.

15. The auxiliary climate control system of claim 5, further comprising a baffle configured to increase mixing of air as it exits the blower and heat exchanger assembly to promote a more uniform temperature cross-section.

16. The auxiliary climate control system of claim 11, further comprising a baffle configured to increase mixing of air as it exits the blower and heat exchanger assembly to promote a more uniform temperature cross-section.

17. An auxiliary climate control system for a vehicle comprising:
    a blower and heat exchanger assembly including a blower, an evaporator, an air flow actuator, and a heater core;
    a condenser in fluid communication with the evaporator;
    a coolant heater, the condenser and the coolant heater below the blower and heat exchanger assembly; and
    a barrier separating the condenser and the coolant heater from the blower and heat exchanger assembly such that the condenser and the coolant heater are outside of a vehicle cab,
    wherein the blower and heat exchanger assembly has a generally 'Z' shaped configuration in a horizontal plane, and
    wherein the barrier comprises a tray that is flush with a floor of the vehicle cab.

* * * * *